(12) United States Patent
Kim et al.

(10) Patent No.: US 8,814,370 B2
(45) Date of Patent: *Aug. 26, 2014

(54) COMPOSITION FOR ANTI-REFLECTIVE COATING AND ANTI-REFLECTIVE COATING FILM USING THE SAME

(71) Applicant: LG Chem, Ltd., Seoul (KR)

(72) Inventors: Heon Kim, Daejeon (KR); Yeong-Rae Chang, Daejeon (KR); Joon-Koo Kang, Daejeon (KR); Jae-Pil Koo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/842,351

(22) Filed: Mar. 15, 2013

(65) Prior Publication Data

US 2013/0216818 A1 Aug. 22, 2013

Related U.S. Application Data (63) Continuation of application No. PCT/KR2012/004763, filed on Jun. 15, 2012.

(30) Foreign Application Priority Data

Aug. 26, 2011 (KR) .................. 10-2011-0085787
Aug. 26, 2011 (KR) .................. 10-2011-0085788
Oct. 6, 2011 (KR) .................. 10-2011-0101994

(51) Int. Cl.
  *C09D 4/02* (2006.01)
  *G02B 1/11* (2006.01)
  *B32B 27/12* (2006.01)
  *C09D 7/12* (2006.01)
  *B32B 7/02* (2006.01)

(52) U.S. Cl.
  USPC ..... 359/601; 427/162; 427/163.4; 428/313.3; 428/313.5; 525/191; 525/221; 525/222; 524/493; 524/522; 524/523

(58) Field of Classification Search
  USPC ............. 359/601; 427/162, 163.4; 428/313.3, 428/313.5; 525/191, 221, 222; 526/493, 526/522, 523; 524/493, 522, 523
  See application file for complete search history.

(56) References Cited

U.S. PATENT DOCUMENTS

| | | |
|---|---|---|
| 2008/0221290 A1 | 9/2008 | Horio |
| 2009/0075074 A1 | 3/2009 | Horio et al. |
| 2010/0265580 A1 | 10/2010 | Yun et al. |
| 2013/0215514 A1 | 8/2013 | Kim et al. |
| 2013/0216819 A1 | 8/2013 | Kim et al. |
| 2013/0222915 A1* | 8/2013 | Kim et al. ............... 359/601 |

FOREIGN PATENT DOCUMENTS

| | | |
|---|---|---|
| JP | 2006106714 A | 4/2006 |
| JP | 2006308832 A | 11/2006 |
| JP | 2007-121993 A | 5/2007 |
| JP | 2007-133236 A | 5/2007 |
| JP | 2009053691 A | 3/2009 |
| JP | 2009086360 A | 4/2009 |
| JP | 2009151270 A | 7/2009 |
| JP | 2010195901 A | 9/2010 |
| KR | 1020040073627 A | 8/2004 |
| KR | 10-2007-0064601 A | 6/2007 |
| KR | 1020070065858 A | 6/2007 |
| KR | 1020090049518 A | 5/2008 |
| KR | 10-2009-0049558 A | 5/2009 |
| KR | 1020100058495 A | 6/2010 |
| TW | 200813172 A | 3/2008 |

OTHER PUBLICATIONS

International Search Report issued in International Appln. No. PCT/KR2012/004763, dated Jan. 2, 2013, 2 pages.
Heraeus Noblelight Fusion UV Inc., What is UV Curing?, Feb. 12, 2009, 4 pages. (The aforementioned date was asserted by the Patent Office in a Notice of References Cited issued on Nov. 5, 2013 in U.S. Appl. No. 13/843,008).
Fuji Silysia Chemical LTD., Sylsia—Micronized particles with high porosity, Dec. 14, 2004, 2 pages. (The aforementioned date was asserted by the Patent Office in a Notice of References Cited issued on Nov. 5, 2013 in U.S. Appl. No. 13/843,008).
W. R. Grace & Co., Colloidal Silica, Aug. 26, 2007, 2 pages. (The aforementioned date was asserted by the Patent Office in a Notice of References Cited issued on Nov. 5, 2013 in U.S. Appl. No. 13/843,008).

* cited by examiner

*Primary Examiner* — Nathan M Nutter
(74) *Attorney, Agent, or Firm* — Rothwell, Figg, Ernst & Manbeck, P.C.

(57) ABSTRACT

The present invention relates to an anti-reflective coating composition that can be used to form at least two layers by a single coating process and is allowed to provide an anti-reflective coating film having more improved interface adhesion between the formed layers and scratch resistance, and an anti-reflective coating film manufactured using the same.

21 Claims, 6 Drawing Sheets

FIG. 6

COMPOSITION FOR ANTI-REFLECTIVE COATING AND ANTI-REFLECTIVE COATING FILM USING THE SAME

CROSS-REFERENCE TO RELATED APPLICATIONS

This application is a continuation of International Application No. PCT/KR2012/004763 filed Jun. 15, 2012, which claims priority to Korean Patent Application No. 10-2011-0085787 filed on Aug. 26, 2011, Korean Patent Application No. 10-2011-0085788 filed on Aug. 26, 2011, and Korean Patent Application No. 10-2011-0101994 filed on Oct. 6, 2011, which are incorporated herein in their entireties.

TECHNICAL FIELD

The present invention relates to an anti-reflective coating composition and an anti-reflective coating film manufactured using the same.

BACKGROUND OF ART

In general, an anti-reflective film (anti-glare film) is disposed to minimize the reflection of external light on the screen of display devices such as PDP, CRT, and LCD.

The conventional anti-reflective coating film is commonly formed by disposition of an anti-reflective layer on a light-transparent substrate. In this regard, the most widely used anti-reflective layer has a three-layer structure of a hard coat layer and high and low refractive index layers sequentially laminated from the light-transparent substrate. Recently, a two-layer structure omitting the hard coat layer or the high refractive index layer from the anti-reflective layer has been commercialized, in order to simplify the production process. In order to provide anti-glare and scratch-resistant properties, the anti-reflective coating film provided with an anti-glare hard coat layer has been also used.

Meanwhile, the anti-reflective coating film is commonly manufactured by a dry or wet method. Of the methods, the dry method is to laminate a plurality of thin layers using deposition or sputtering. This method offers superior adhesion at a layer interface, but requires high production cost, which is a limitation to commercial use.

In contrast, the wet method is to dry and cure a composition comprising a binder, a solvent, etc., after applying it onto a substrate. This method is less expensive than the dry method, and thus widely used in commercial applications. In the wet method, however, compositions required for the formation of the hard coat layer and the high and low refractive index layers should be prepared separately, and each layer is sequentially formed using the composition. Thus, the production process becomes complicated, and offers weak adhesion at a film interface.

For this reason, many studies have been actively made to develop an anti-reflective coating composition capable of forming two or more layers by a single wet coating process. However, there are still many problems that phase separation does not properly occur upon applying the compositions during the production process, and thus individual layers deteriorate in functions.

Further, the hard coat layer or the high refractive index layer is typically formed on the substrate as a pure binder or as a separate layer comprising the binder and inorganic nanoparticles, and the hollow particle-dispersed low refractive index layer is formed thereon. However, there are still problems that the anti-reflective coating film having this structure has low durability because of weak adhesion at a layer interface.

DISCLOSURE OF INVENTION

Technical Problem

Accordingly, the present invention provides a composition that is allowed to provide an anti-reflective coating film having more improved interface adhesion and scratch resistance, while it is able to form at least two layers by a single coating process.

Further, the present invention provides an anti-reflective coating film manufactured using the same.

Technical Solution

According to one embodiment of the present invention, provided is an anti-reflective coating composition, comprising a (meth)acrylate-based compound having a first molecular weight; a (meth)acrylate-based compound having a second molecular weight higher than the first molecular weight; inorganic nanoparticles; and hollow particles.

In this regard, the first molecular weight may be approximately less than 600, and the second molecular weight may be approximately 600 to 100,000. The anti-reflective coating composition may further comprise an initiator and/or a solvent.

For example, the composition may comprise approximately 5 to 30 parts by weight of the (meth)acrylate-based compound having the second molecular weight; approximately 5 to 30 parts by weight of the inorganic nanoparticles; approximately 1 to 30 parts by weight of the hollow particles; approximately 5 to 25 parts by weight of the initiator; and approximately 100 to 500 parts by weight of the solvent, based on 100 parts by weight of the (meth)acrylate-based compound having the first molecular weight.

The (meth)acrylate-based compound having the first molecular weight may be one or more compounds selected from the group consisting of pentaerythritol tri(meth)acrylate, pentaerythritol tetra(meth)acrylate, dipentaerythritol hexa(meth)acrylate, trimethylenepropane tri(meth)acrylate, ethylene glycol di(meth)acrylate, 9,9-bis[4-(2-acryloxyethoxy)phenyl]fluorene, bis(4-methacryloxythiophenyl)sulfide, and bis(4-vinylthiophenyl)sulfide.

The anti-reflective coating composition of one embodiment may further comprise a fluorine-based (meth)acrylate compound substituted with one or more fluorine atoms.

The (meth)acrylate-based compound having the second molecular weight may comprise a compound having two or more molecules of the (meth)acrylate-based compound having the first molecular weight linked via a linker, and the linker may comprise a urethane bond, a thioether bond, an ether bond or an ester bond. In addition, the (meth)acrylate-based compound having the second molecular weight may have one or more substituents selected from the group consisting of an epoxy group, a hydroxyl group, a carboxyl group, a thiol group, an aromatic or aliphatic hydrocarbon group having 6 carbon atoms or more, and an isocyanate group.

In the composition of one embodiment, the solvent may have a dielectric constant (25° C.) of 20 to 30, and a dipole moment of 1.7 to 2.8.

Further, the inorganic nanoparticles may have a number average diameter of 5 to 50 nm, and for example, they may be silica nanoparticles.

Further, the hollow particles may have a number average diameter of 5 to 80 nm, and for example, they may be hollow silica particles.

Meanwhile, according to another embodiment of the present invention, provided is an anti-reflective coating film comprising the first layer that comprises a crosslinked polymer of the (meth)acrylate-based compound having the first molecular weight and inorganic nanoparticles in the crosslinked polymer, and has infiltrated into the substrate; and the second layer that comprises a crosslinked copolymer of the (meth)acrylate-based compound having the first molecular weight and the (meth)acrylate-based compound having the second molecular weight higher than the first molecular weight and hollow particles in the crosslinked copolymer, and that covers the first layer.

In this regard, the first layer may further comprise the crosslinked copolymer of the (meth)acrylate-based compound having the first molecular weight and the (meth)acrylate-based compound having the second molecular weight, and the second layer may further comprise the inorganic nanoparticles.

Advantageous Effects

An anti-reflective coating composition according to the present invention can be used to form at least two layers by a single coating process, thereby providing an anti-reflective coating film having more improved interface adhesion and scratch resistance.

REFERENCE NUMERALS

1: Substrate
2: First layer (Hard coat layer)
3: Second layer (Low refractive index layer)
4: Hollow particles

BEST MODE FOR CARRYING OUT THE INVENTION

Hereinafter, an anti-reflective coating composition according to embodiments of the present invention will be described with reference to the accompanying drawings.

In advance, unless otherwise specified throughout the specification, several terms used herein are defined as follows.

First, the term 'inorganic nanoparticle' means a particle made from various inorganic materials, and encompasses particles having a number average diameter in nanometer scale, for example, a number average diameter of 100 nm or less. These inorganic nanoparticles may be amorphous particles having substantially no void therein. For example, 'silica nanoparticles' are particles made from a silicon compound or an organic silicon compound, and means silicon compound particles or organic silicon compound particles having a number average diameter of 100 nm or less and substantially no void therein.

Further, the term 'hollow particle' means an organic or inorganic particle having a void on the surface thereof and/or therein. For example, the term 'hollow silica particle' means a silica particle that is made from a silicon compound or an organic silicon compound and has a void on the surface of and/or inside the silica particle.

Further, the term '(meth)acrylate' is defined to encompass acrylate and methacrylate. The term '(meth)acrylate' may be also defined to have no fluorine-containing substituent, and a compound having the fluorine-containing substituent may be referred to as a fluorine-based (meth)acrylate compound, in order to distinguish from each other.

Further, the term 'coating layer' means a composition layer formed by applying (coating) the anti-reflective coating composition set forth below on a substrate film.

Further, the term 'phase separation' refers to the difference in distribution of a particular component from other components in the composition due to a difference in density, surface tension, or other physical properties of the components. Herein, when phase separation in the coating occurs, at least two layers that can be distinguished are formed according to the distribution difference of a particular component, for example, distribution difference of hollow particles.

Further, the phrase 'infiltrated into the substrate' means that ingredients for forming any layer of the anti-reflective coating film (for example, (meth)acrylate-based compound for forming a binder for the corresponding layer and inorganic nanoparticles, etc) penetrate into the substrate to form the corresponding layer. For example, the ingredients that penetrate into the substrate are dried and cured so as to form a particular layer in the region of the substrate into which they have penetrated. In contrast, the phrase 'a layer is formed on the substrate' means that the ingredients for forming the corresponding layer substantially do not penetrate into the substrate, and they are dried and cured while forming an interface with the substrate, thereby forming a layer on the substrate without an overlapping region with the substrate by penetrating into the substrate.

Further, the phrase 'a layer (e.g., the second layer of one embodiment of the present invention) covers the other layer (e.g., the first layer of that embodiment)' means that there is substantially no distinctive layer between the two layers. For example, in the anti-reflective coating film of one embodiment, 'the second layer comprising hollow particles covers the first layer that has infiltrated into the substrate' means that there is substantially no separate and distinctive layer between the first layer infiltrated into the substrate and the second layer comprising hollow particles, for example, substantially no separate layer that has not infiltrated into the substrate and does not comprise hollow particles. For example, in one embodiment, a separate layer that comprises only the binder (e.g., crosslinked polymer formed from the (meth)acrylate-based compound) and/or inorganic nanoparticles and that has not infiltrated into the substrate does not exist between the first layer, that is, the infiltration layer and the second layer comprising hollow particles.

Meanwhile, the present inventors have studied the anti-reflective coating composition. As a result, they found that when at least two types of (meth)acrylate-based compounds having different molecular weights are mixed with each other and used as a binder composition, spontaneous phase separation of the composition can be properly induced, and the anti-reflective coating film having more improved interface adhesion, scratch resistance and anti-reflective effect can be manufactured, thereby completing the present invention.

According to one embodiment of the present invention, provided is an anti-reflective coating composition comprising a (meth)acrylate-based compound having a first molecular weight; a (meth)acrylate-based compound having a second molecular weight higher than the first molecular weight; inorganic nanoparticles; and hollow particles.

Hereinafter, individual components comprised in the above composition will be described in more detail.

(Meth)Acrylate-Based Compound Having First Molecular Weight

First, the composition of one embodiment may comprise the (meth)acrylate-based compound having the first molecular weight. If the composition of one embodiment is applied to any substrate, at least a part of the (meth)acrylate-based compound having the first molecular weight may infiltrate into the substrate.

The (meth)acrylate-based compound having the first molecular weight infiltrated into the substrate is polymerized alone or copolymerized with the (meth)acrylate-based compound explained below and having the second molecular weight to form a binder of the first layer corresponding to the infiltrated region.

A part of the (meth)acrylate-based compound having the first molecular weight may infiltrate into the substrate. The part of the compound is copolymerized with the after-mentioned the (meth)acrylate-based compound having the second molecular weight to form a binder of other layer covering the first layer of the infiltrated region.

In order to sufficiently infiltrate the (meth)acrylate-based compound into the substrate and to form the binder of the first layer as the hard coat layer of the anti-reflective coating film, the first molecular weight may be, for example, less than approximately 600, or less than approximately 500, or less than approximately 400, and in another embodiment, it may be approximately 50 or more, or approximately 100 or more.

In exemplary embodiment, in order to form the first layer that has infiltrated into the substrate and shows higher refractive index (e.g., hard coat layer and/or high refractive index layer), the (meth)acrylate-based compound having the first molecular weight may have a substituent such as sulfur, chlorine or metal, or an aromatic substituent.

The (meth)acrylate-based compound having the first molecular weight may comprise a compound selected from the group consisting of pentaerythritol tri(meth)acrylate, pentaerythritol tetra(meth)acrylate, dipentaerythritol hexa(meth)acrylate, trimethylenepropane tri(meth)acrylate, ethylene glycol di(meth)acrylate, 9,9-bis[4-(2-acryloxyethoxy)phenyl]fluorene (refractive index: 1.62), bis(4-methacryloxythiophenyl)sulfide (refractive index: 1.689), and bis(4-vinylthiophenyl)sulfide (refractive index: 1.695) or a mixture of two or more thereof (Meth)Acrylate-Based Compound Having Second Molecular Weight Meanwhile, the composition of one embodiment may comprise the (meth)acrylate-based compound having the second molecular weight higher than the first molecular weight as the binder composition. When the composition comprising the (meth)acrylate-based compound having the second molecular weight is applied to any substrate, a relatively smaller amount thereof may infiltrate into the substrate, compared to the above mentioned compound having the first molecular weight, and the rest thereof may remain on the substrate, due to its high molecular weight and bulky chemical structure.

Therefore, the (meth)acrylate-based compound having the second molecular weight does not infiltrated into the substrate to a depth equivalent to that of the above mentioned (meth)acrylate-based compound having the first molecular weight. As a result, the infiltrated region of the substrate may be divided into the following two regions. First, in the region infiltrated with only the (meth)acrylate-based compound having the first molecular weight or in the region at a depth to be infiltrated therewith, a polymer binder of the (meth)acrylate-based compound having the first molecular weight may exist. In the other infiltrated region that is infiltrated with the (meth)acrylate-based compound having the second molecular weight, the copolymer binder of the (meth)acrylate-based compound having the second molecular weight and the (meth)acrylate-based compound having the first molecular weight may exist.

The residual (meth)acrylate-based compound having the second molecular weight that has not infiltrated into the substrate may be copolymerized with the above mentioned compound having the first molecular weight to form a binder of the other layer (e.g., low refractive index layer of anti-reflective coating film) covering the infiltration layer. Therefore, interface adhesion between the infiltration layer serving as the hard coat layer of the anti-reflective coating film and the low refractive index layer covering thereon is improved, scratch resistance of the low refractive index layer is also improved, and hollow particles in the low refractive index layer are more compactly dispersed.

The (meth)acrylate-based compound having the second molecular weight is a compound having a higher molecular weight than the above mentioned compound having the first molecular weight and a bulky structure. For example, it may have a molecular weight of approximately 400 or more, or approximately 500 or more, or approximately 600 or more. For another example, the second molecular weight may be approximately 100,000 or less, or approximately 80,000 or less, or approximately 50,000 or less.

For the high molecular weight and bulky structure, the (meth)acrylate-based compound having the second molecular weight may comprise a compound having a structure of linking two or more molecules of the above mentioned (meth)acrylate-based compound having the first molecular weight via a linker. In this regard, the linker may be any chemical bond known to link the (meth)acrylate-based compounds, and for example, a divalent or higher-valent radical comprising a urethane bond, a thioether bond, an ether bond or an ester bond.

For more bulky structure, the (meth)acrylate-based compound having the second molecular weight may also have one or more substituents selected from the group consisting of an epoxy group, a hydroxyl group, a carboxyl group, a thiol group, an aromatic or aliphatic hydrocarbon group having 6 carbon atoms or more, and an isocyanate group.

The (meth)acrylate-based compound having the second molecular weight may be a commercially available product satisfying the above conditions or directly synthesized. Examples of the commercially available product may comprise UA-306T, UA-306I, UA-306H, UA-510T, UA-510I, and UA-510H (products of KYOEISHA Co.); BPZA-66 and BPZA-100 (products of KYOEISHA Co.); EB9260 and EB9970 (products of BAEYER Co.); and Miramer SP1107 and Miramer SP1114 (products of MIWON Co.).

The above mentioned (meth)acrylate-based compound having the second molecular weight may be comprised in an amount of approximately 5 to 30 parts by weight, or approximately 5 to 25 parts by weight, or approximately 5 to 20 parts by weight, based on 100 parts by weight of the compound having the first molecular weight. The content of the (meth) acrylate-based compound having the second molecular weight may be determined, considering optimization of physical properties of the layer or changes in the distribution of hollow particles according to addition of an excessive amount thereof as well as minimal effects achieved by mixed use of the binder compositions.

Fluorine-Based (Meth)Acrylate-Based Compound

Meanwhile, the composition of one embodiment may further comprise a fluorine-based (meth)acrylate compound substituted with one or more fluorine atoms as the binder composition. Owing to the presence of the fluorine-containing substituent, the fluorine-based (meth)acrylate compound is not infiltrated into the substrate when the composition is applied to the substrate. Owing to the presence of the fluorine-containing substituent, the fluorine-based (meth)acrylate compound is not infiltrated into the substrate when the composition of one embodiment is applied to the substrate. For this reason, the fluorine-based (meth)acrylate compound may form the binder of the hollow particle-containing layer that serves as the low refractive index layer of the anti-reflective coating film, together with the (meth)acrylate compounds having the first and second molecular weights. The fluorine-based (meth)acrylate compound shows a lower refractive index, thereby reducing the refractive index of the low refractive index layer and showing excellent compatibility with the after-mentioned hollow particles due to polar functional groups, and also improving scratch resistance of the low refractive index layer.

The fluorine-based (meth)acrylate compound may have a structure of linking one or more fluorine-containing substituents to any (meth)acrylate compound, and examples of the fluorine-based (meth)acrylate compound may be one or more compounds selected from the group consisting of the compounds of the following Chemical Formulae 1 to 5:

[Chemical Formula 1]

wherein $R^1$ is a hydrogen group or an alkyl group having 1 to 6 carbon atoms, a is an integer of 0 to 7, and b is an integer of 1 to 3;

[Chemical Formula 2]

wherein c is an integer of 1 to 10;

[Chemical Formula 3]

wherein d is an integer of 1 to 11;

[Chemical Formula 4]

wherein e is an integer of 1 to 5;

[Chemical Formula 5]

wherein f is an integer of 4 to 10.

Meanwhile, the fluorine-based (meth)acrylate compound may be comprised in an amount of approximately 0.5 to 20 parts by weight, or approximately 5 to 18 parts by weight, or approximately 10 to 16 parts by weight, based on 100 parts by weight of the (meth)acrylate compound having the first molecular weight.

The fluorine-based (meth)acrylate compound may be a commercially available product satisfying the above conditions. Examples of the commercially available product may comprise OPTOOL AR110 (manufactured by DAIKIN), LINC-3A and LINC-102A (manufactured by KYOEISHA), PFOA (manufactured by Exfluor), and OP-38Z (manufactured by DIC).

Inorganic Nanoparticles

Meanwhile, inorganic nanoparticles may be comprised in the composition of one embodiment.

A part of the inorganic nanoparticles may be infiltrated into and dispersed in the substrate, together with the above mentioned two or more binder compositions, when the composition of one embodiment is applied to any substrate. The rest thereof not infiltrated into the substrate is dispersed in the coating layer on the substrate, which serves as the low refractive index layer, and contributes to the improvement of scratch resistance and anti-reflective effect.

In one embodiment, the inorganic nanoparticles may be particles that are generated from various inorganic materials and have a number average diameter of nanometer scale.

These inorganic nanoparticles may have a number average diameter of, for example, approximately 100 nm or less, or approximately 5 to 50 nm, or approximately 5 to 20 nm. To control transparency, refractive index, and scratch resistance of the coating layer, the diameter of the inorganic nanoparticles should be controlled within the above range.

Further, to obtain improved transparency of the coating layer on the substrate, the silica nanoparticles generated from the silicon compound or organic silicon compound may be used as inorganic nanoparticles.

The inorganic nanoparticles may be comprised in an amount of, for example, approximately 5 to 30 parts by weight, or approximately 5 to 25 parts by weight, or approximately 5 to 20 parts by weight, based on 100 parts by weight of the (meth)acrylate-based compound having the first molecular weight. The content of the inorganic nanoparticles may be controlled within the above range, considering the infiltration content of inorganic nanoparticles according to the type of substrate and a reduction of anti-reflective effect by increased reflectance resulting from addition of an excessive amount thereof as well as the minimal effect of the inorganic nanoparticles.

Meanwhile, the inorganic nanoparticles are dispersed in a predetermined dispersion medium, and may be comprised in the form of sol having a solid content of approximately 5 to 40% by weight. Herein, examples of the organic solvent to be used as the dispersion medium may comprise alcohols such as methanol, isopropyl alcohol (IPA), ethylene glycol, and butanol; ketones such as methyl ethyl ketone (MEK) and methyl isobutyl ketone (MIBK); aromatic hydrocarbons such as toluene and xylene; amides such as dimethyl formamide, dimethyl acetamide, and N-methyl pyrrolidone; esters such as ethyl acetate, butyl acetate, and γ-butyrolactone; ethers such as tetrahydrofuran and 1,4-dioxane; or mixtures thereof.

According to one embodiment, commercially available silica sol may be used as the inorganic particles, and exemplified by MEK-ST, MIBK-ST, MIBK-SD, MIBK-SD-L, MEK-AC, DMAC-ST, and EG-ST manufactured by Nissan chemical Co.; or Purisol manufactured by Gaematech Co.

Hollow Particles

Meanwhile, hollow particles may be further comprised in the composition of one embodiment. These hollow particles mean particles having voids on the surface of and/or inside the particles, and are an ingredient for achieving low refractive index and anti-reflective effect.

These hollow particles, when the composition of one embodiment is applied to the substrate, are substantially not distributed in the infiltration layer in the substrate, which serves as the hard coat layer of the anti-reflective coating film, and they are substantially distributed in the layer covering the first layer, that is, in the low refractive index layer of the anti-reflective coating film. Herein, the hollow particles "substantially not distributed (comprised)" in the infiltration layer mean that the content of the hollow particles present in the infiltration layer is less than approximately 3% by weight, or less than approximately 1% by weight, based on the total weight of the hollow particles.

Meanwhile, a solvent is comprised in the composition of one embodiment, together with the above mentioned binder compositions, etc., and therefore, spontaneous phase separation occurs to form the anti-reflective coating film. At this time, when phase separation occurs, the hollow particles are substantially not distributed in the infiltration layer due to the difference in the density or in surface energy between the hollow particles and other components, and they are compactly distributed in the layer on the substrate, which serves as the low refractive index layer. As a result, it is possible to form the anti-reflective coating film showing more improved film strength, scratch resistance and anti-reflective property.

The material of these hollow particles is not particularly limited, as long as it is in the form of particles having voids on the surface of and/or inside the particles. In one embodiment, in order to provide the low refractive index layer with transparency and/or low refractive index, hollow silica particles generated from the silicon compound or organic silicon compound may be used.

At this time, the diameter of the hollow particles may be determined within the range of maintaining transparency of the film and showing anti-reflective effect. For example, the hollow particles may have a number average diameter of approximately 5 to 80 nm, or approximately 10 to 75 nm, or approximately 20 to 70 nm.

The hollow particles may be comprised in an amount of approximately 1 to 30 parts by weight, or approximately 1 to 25 parts by weight, or approximately 5 to 20 parts by weight, based on 100 parts by weight of the above mentioned (meth)acrylate-based compound having the first molecular weight. In order to achieve their minimal effect of hollow particles and formation of their preferred distribution by phase separation, the content of the hollow particles may be controlled within the above mentioned range.

Further, the hollow particles may be dispersed in a dispersion medium (water or organic solvent), and comprised in the form of colloid having a solid content of approximately 5 to 40% by weight. Herein, examples of the organic solvent to be used as the dispersion medium may comprise alcohols such as methanol, isopropyl alcohol (IPA), ethylene glycol, and butanol; ketones such as methyl ethyl ketone (MEK) and methyl isobutyl ketone (MIBK); aromatic hydrocarbons such as toluene and xylene; amides such as dimethyl formamide, dimethyl acetamide, and N-methyl pyrrolidone; esters such as ethyl acetate, butyl acetate, and γ-butyrolactone; ethers such as tetrahydrofuran and 1,4-dioxane; or mixtures thereof Solvent A solvent may be further comprised in the composition of one embodiment. The solvent functions to control infiltration of the binder compositions into the substrate and the phase separation and distribution pattern of hollow particles as well as the viscosity of the composition within the proper range.

In order to achieve the above effects, the solvent may be a solvent having a dielectric constant (25° C.) of approximately 20 to 30 and a dipole moment of approximately 1.7 to 2.8. Examples of the solvent capable of satisfying these physical properties may comprise methyl ethyl ketone, ethyl acetate, acetyl acetone or the like, and any solvent capable of satisfying the physical properties can be also used. According to one embodiment, other solvent may be also mixed, together with the solvent capable of satisfying the physical properties. Examples of the solvent to be mixed may comprise isobutyl ketone, methanol, ethanol, n-butanol, i-butanol, t-butanol or the like. However, in terms of proper phase separation, it is preferable that the solvent satisfying the range of the dielectric constant and dipole moment is comprised in an amount of approximately 60% by weight or more, based on the total weight of the solvent comprised in the composition.

In the composition of one embodiment, the solvent may be comprised in an amount of, for example, approximately 100 to 500 parts by weight, or approximately 100 to 450 parts by weight, or approximately 100 to 400 parts by weight, based on 100 parts by weight of the (meth)acrylate-based compound having the first molecular weight. If the composition shows bad flowability upon coating, defects such as stripes on the coating layer may be generated. In order to provide the composition with the minimum flowability required, the solvent may be comprised in the predetermined content or more. When an excessive amount of the solvent is added, the solid content becomes too low, and therefore, defects may be generated upon drying and curing, and the distribution of the hollow particles may be deviated from the preferred range.

Initiator

Meanwhile, an initiator may be further comprised in the composition of one embodiment. The initiator is a compound that is activated by energy ray such as ultraviolet ray so as to induce polymerization of the binder compositions. A compound typically used in the art may be used.

Examples of the initiator may comprise 1-hydroxy cyclohexylphenyl ketone, benzyl dimethyl ketal, hydroxy dimethyl acetophenone, benzoin, benzoin methyl ether, benzoin ethyl ether, benzoin isopropyl ether or benzoin butyl ether, and various other photoinitiators.

At this time, the content of the initiator may be, for example, approximately 5 to 25 parts by weight, or approximately 5 to 20 parts by weight, or approximately 5 to 15 parts by weight, based on 100 parts by weight of the (meth)acrylate-based compound having the first molecular weight. For sufficient polymerization of the binder compositions, the initiator may be comprised in the predetermined content or more. When an excessive amount of the initiator is added, each layer constituting the anti-reflective coating film may have the reduced mechanical properties such as scratch resistance or abrasion resistance.

Meanwhile, according to another embodiment of the present invention, provided is an anti-reflective coating film manufactured by using the above mentioned composition. For example, the anti-reflective coating film comprises the first layer that comprises a crosslinked polymer of the (meth)acrylate-based compound having the first molecular weight and inorganic nanoparticles in the crosslinked polymer, and that has infiltrated into the substrate; and the second layer that comprises the crosslinked copolymer of the (meth)acrylate-based compound having the first molecular weight and the (meth)acrylate-based compound having the second molecular weight higher than the first molecular weight and hollow particles in the crosslinked copolymer, and that covers the first layer.

In the anti-reflective coating film, the first layer infiltrated into the substrate functions as the hard coat layer of the anti-reflective coating film and functions as the high refractive index layer showing a refractive index of approximately 1.5 or more.

The hard coat layer may comprise the binder of the crosslinked polymer of the (meth)acrylate-based compound having the first molecular weight and inorganic nanoparticles in the binder, which has infiltrated into the substrate.

Further, all or most (e.g., approximately 97% by weight or more, or approximately 99% by weight or more) of the hollow particles are substantially distributed in the second layer that is formed to be in contact with and cover the first layer infiltrated into the substrate, and thus the second layer functions as the low refractive index layer of the anti-reflective coating film. This low refractive index layer shows a low refractive index of approximately 1.45 or less, thereby exhibiting proper anti-reflective effect.

In the anti-reflective coating film, the first layer serving as the hard coat layer may further comprise the crosslinked copolymer of the (meth)acrylate-based compound having the first molecular weight and the (meth)acrylate-based compound having the second molecular weight, as the binder. The second layer serving as the low refractive index layer may further comprise inorganic nanoparticles.

Figure 1:
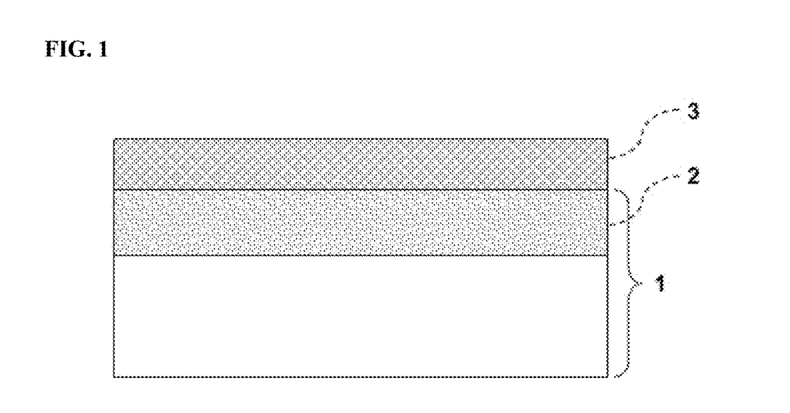
FIG. 1 is a schematic cross-sectional view showing a structure of an anti-reflective coating film that is manufactured using a composition according to one embodiment of the present invention.

FIG. 1 is a schematic cross-sectional view showing the anti-reflective coating film according to an exemplary embodiment. With reference to FIG. 1, in the anti-reflective coating film manufactured by using the composition of one embodiment, the first layer 2 serving as the hard coat layer is infiltrated into the substrate 1, and cured therein, and the second layer 3 serving as the low refractive index layer is formed on the substrate by contacting with and covering the first layer 2 as the infiltration layer. In this regard, there is no separate layer between the first layer 2 infiltrated into the substrate and the second layer 3 on the substrate, which means that a separate layer, for example, comprising only the binder and/or the inorganic nanoparticles and substantially no hollow particles and without having infiltrated into the substrate does not exist between the first layer as the infiltration layer and the second layer substantially having hollow particles.

As the first layer 2 serving as the hard coat layer has infiltrated into the substrate 1, and the second layer 3 serving as the low refractive index layer is formed on the substrate to be in contact therewith, the anti-reflective coating film of another embodiment has excellent interface adhesion between the substrate, hard coat layer and low refractive index layer, and therefore, delamination can be minimized during use. Further, the hollow particles can be compactly distributed in the second layer serving as the low refractive index layer, thereby exhibiting excellent low refractive index property and anti-reflective effect.

Hereinafter, individual layers comprised in the anti-reflective coating film of another embodiment will be described in more detail.

First, the anti-reflective coating film comprises the substrate. As shown in FIG. 1, the substrate 1 is a typical transparent thin film, and any material may be used without limitation, as long as it can be infiltrated with the binder of the after-mentioned first layer and the inorganic nanoparticles. For example, the substrate may be made from polyester-based resins, polycarbonate-based resins, acrylic-based resins, acetate cellulose resins or the like. In one exemplary embodiment, a triacetate cellulose (TAC) resin may be used as the substrate in order to improve transparency and anti-reflective effect.

Further, the anti-reflective coating film may comprise the first layer 2 serving as the hard coat layer, which comprises a binder of a crosslinked polymer of the (meth)acrylate-based compound having the first molecular weight and inorganic nanoparticles in the binder. The hard coat layer may be a layer infiltrated into the substrate. The first layer 2 may be cured and integrated into the substrate by infiltration of the binder and the inorganic nanoparticles into the substrate. Even though FIG. 1 shows infiltration of the first layer 2 into the entire surface of the substrate 1, the first layer 2 may infiltrate into a part of the substrate 1 in another embodiment.

The second layer 3 serving as the low refractive index layer is formed to be in contact with and cover the first layer 2 infiltrated into the substrate 1, and it may be a layer comprising hollow particles. More particularly, a separate layer comprising only the binder and/or inorganic nanoparticles and having not infiltrated into the substrate does not exist between the first layer 2 and the second layer 3. As in the known films, a separate layer composed of only the binder exists between the hard coat layer and the low refractive index layer results in a disadvantage of reducing adhesion between each layer and the substrate. In contrast, the anti-reflective coating film of another embodiment is formed such that the second layer 3 serving as the low refractive index layer is in contact with the substrate 1 and the first layer 2 serving as the hard coat layer, thereby showing more improved interface adhesion, scratch resistance, and anti-reflective effect.

Herein, the binder of the second layer 3 may comprise the crosslinked copolymer of the (meth)acrylate-based compound having the first molecular weight and the (meth)acrylate-based compound having the second molecular weight.

The binder of the first layer 2 may comprise the crosslinked copolymer of the (meth)acrylate-based compound having the first molecular weight and the (meth)acrylate-based compound having the second molecular weight, and the crosslinked polymer of the (meth)acrylate-based compound having the first molecular weight.

In this regard, the crosslinked copolymer in the binder of the first layer 2 may be comprised to approximately 5 to 50% depth, or approximately 5 to 45% depth, or approximately 5 to 40% depth of the first layer 2, based on the interface between the first layer 2 and the second layer 3. The crosslinked copolymer in the binder of the first layer 2 may be comprised to exhibit an increasing distribution gradient toward the second layer 3.

As such, the (meth)acrylate-based compound having the second molecular weight is crosslinked copolymerized with the (meth)acrylate-based compound having the first molecular weight with distribution gradient to the predetermined depth of the first layer 2, and the crosslinked copolymers are also comprised throughout the second layer 3. Therefore, the interface adhesion between the first layer 2 and the second layer 3 can be more improved, and hollow particles comprised in the second layer 3 can be more compactly distributed.

In the above mentioned anti-reflective coating film, the first layer 2 is a layer having a higher refractive index than the second layer 3 serving as the low refractive index layer, and the refractive index may be approximately 1.5 to 1.58, or approximately 1.5 to 1.57, or approximately 1.51 to 1.56. In addition, the second layer 3 may have a refractive index of approximately 1.1 to 1.45, or approximately 1.15 to 1.43, or approximately 1.2 to 1.42.

In addition, the anti-reflective coating film of another embodiment has a reflectance of approximately 0.5 to 4%, or approximately 0.8 to 3%, or approximately 1 to 2% to show excellent anti-reflective properties, and thus it can be properly used as the anti-reflective coating film in various display devices such as PDP, CRT or LCD.

Figure 2:
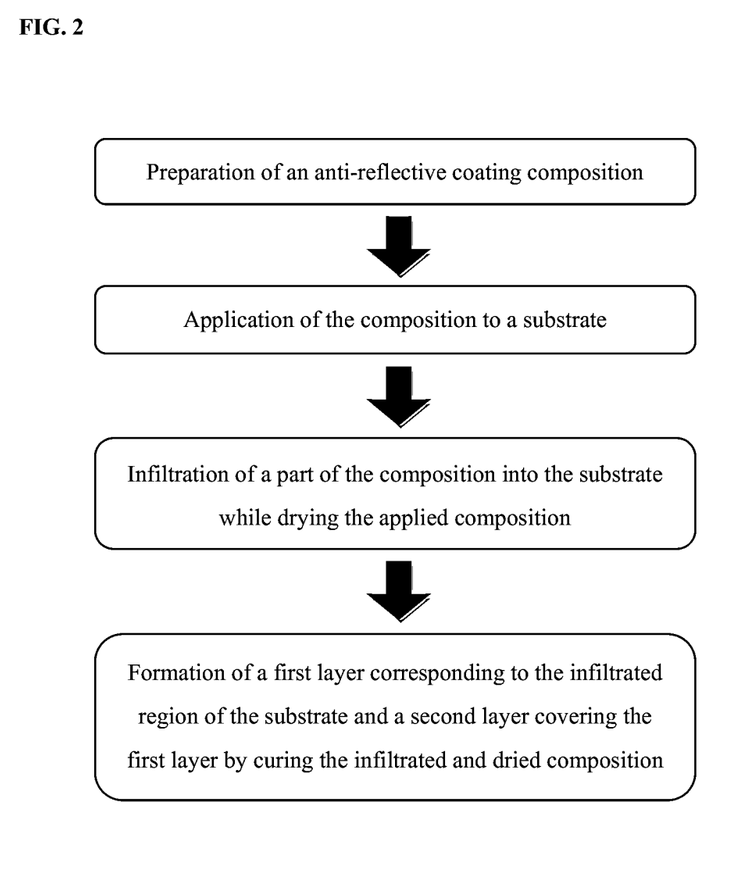
FIG. 2 is a schematic flow chart showing a manufacturing method of an anti-reflective coating film according to one embodiment of the present invention.

Meanwhile, the above mentioned anti-reflective coating film, as shown in FIG. 2, may be manufactured by the method comprising the steps of:

providing the composition of one embodiment;

applying it onto at least one surface of the substrate;

drying the composition to allow a part of the binder composition and inorganic nanoparticles to infiltrate into the substrate; and curing the infiltrated and dried composition to form the first layer corresponding to the infiltrated region of the substrate, and the second layer that comprises hollow particles and covers the first layer.

Through the manufacturing method, the solvent having certain physical properties in the composition may first dissolve a part of the substrate, and subsequently, parts of the binder compositions (e.g., parts of the (meth)acrylate-based compounds having the first and second molecular weights) and at least a part of the inorganic nanoparticles may be infiltrated into the substrate. At this time, the remainder of the binder compositions and the inorganic nanoparticles that have not infiltrated, and the hollow particles may form the coating layer (e.g., second layer) on the substrate. In particular, this coating layer may remain as a thin layer on the substrate that is infiltrated with the above components, and the hollow particles may compactly exist inside the coating layer.

Thereafter, when a curing process is performed, the binders of the first and second layers are formed, and the first layer serving as the hard coat layer may be formed as an infiltration layer inside the substrate and the second layer comprising the hollow particles may be formed to cover the first layer. As a result, the anti-reflective coating film of another embodiment can be manufactured.

As described above, even though a single coating and curing process is applied using a single composition, the anti-reflective coating film of another embodiment can be manufactured by a simple process owing to infiltration of parts of the components into the substrate and phase separation. In this anti-reflective coating film, in particular, the first layer serving as the hard coat layer has infiltrated into the substrate to be in contact with the second layer, thereby showing excellent interface adhesion and mechanical properties. In this anti-reflective coating film, furthermore, a separate layer does not exist between the first and second layers, and hollow particles are compactly present in the second layer, thereby showing lower refractive index and excellent anti-reflective property. As the composition of one embodiment comprises at least two types of the (meth)acrylate-based compounds having different molecular weights, infiltration into the substrate and phase separation can be optimized Hereinafter, preferred Examples of the present invention will be described for better understanding. However, the following Examples are given for illustrative purposes only, and are not intended to limit the present invention.

Example 1

Preparation of Anti-Reflective Coating Composition

Based on 100 parts by weight of a (meth)acrylate-based compound comprising 100 parts by weight of pentaerythritol hexaacrylate (molecular weight: 298.3) and 11.33 parts by weight of acrylate having a urethane functional group (manufactured by KYOEISHA, product name: UA-306T, molecular weight: 1000);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819, and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

The anti-reflective coating composition was applied to a triacetate cellulose film (thickness of 80 µm) using a wire bar (No. 9). The film was dried in a 90° C. oven for 1 minute, and then UV energy of 200 mJ/cm$^2$ was irradiated thereto for 5 seconds to cure the composition.

Finally, an anti-reflective coating film comprising a hard coat layer formed by infiltration into a substrate and a low refractive index layer directly formed on the hard coat layer was manufactured.

Figure 3:
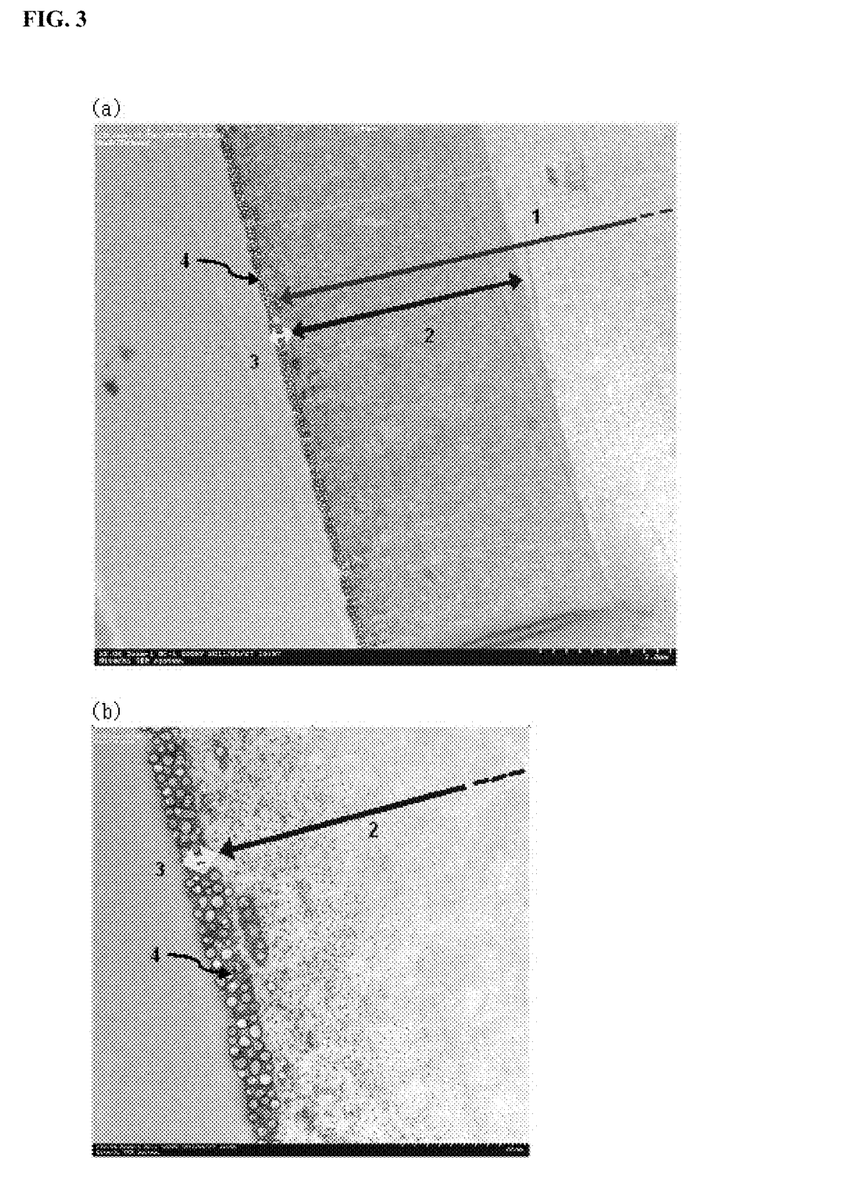
FIGS. 3 to 6 are microscopic images showing the cross-sections of anti-reflective coating films according to Examples 1, 2, and 4 and Comparative Example 1, respectively.

A cross-sectional image of the anti-reflective coating film is shown in FIG. 3(a), and a microscopic image of a part thereof is shown in FIG. 3(b). As shown in FIG. 3, the anti-reflective coating film according to Example 1 was found to have a hard coat layer 2 (approximately 3.9 μm) comprising a binder cured by infiltration into a substrate 1 and inorganic nanoparticles dispersed in the binder; a low refractive index layer 3 (approximately 0.15 μm) comprising a binder cured on the hard coat layer 2 and hollow particles 4 dispersed in the binder.

In addition, there was no separate layer between the hard coat layer 2 and the low refractive index layer 3, and a ratio of the cross-sectional area of the hollow particles 4 to any cross-sectional area of the low refractive index layer 3 was approximately 90%, indicating that hollow particles 4 were very compactly distributed in the low refractive index layer 3.

Example 2

Preparation of Anti-Reflective Coating Composition

Based on 100 parts by weight of a (meth)acrylate-based compound comprising 100 parts by weight of pentaerythritol hexaacrylate (molecular weight: 298.3), 11.33 parts by weight of fluorine-based acrylate (product name: OPTOOL AR110, manufactured by DAIKIN, solid content: 15% by weight, methyl isobutyl ketone solvent), and 11.33 parts by weight of acrylate having a urethane functional group (manufactured by KYOEISHA, product name: UA-306T, molecular weight: 1000);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

Manufacturing of Anti-Reflective Coating Film

An anti-reflective coating film was manufactured under the same conditions and in the same manner as in Example 1, except using the above anti-reflective coating composition.

Figure 4:
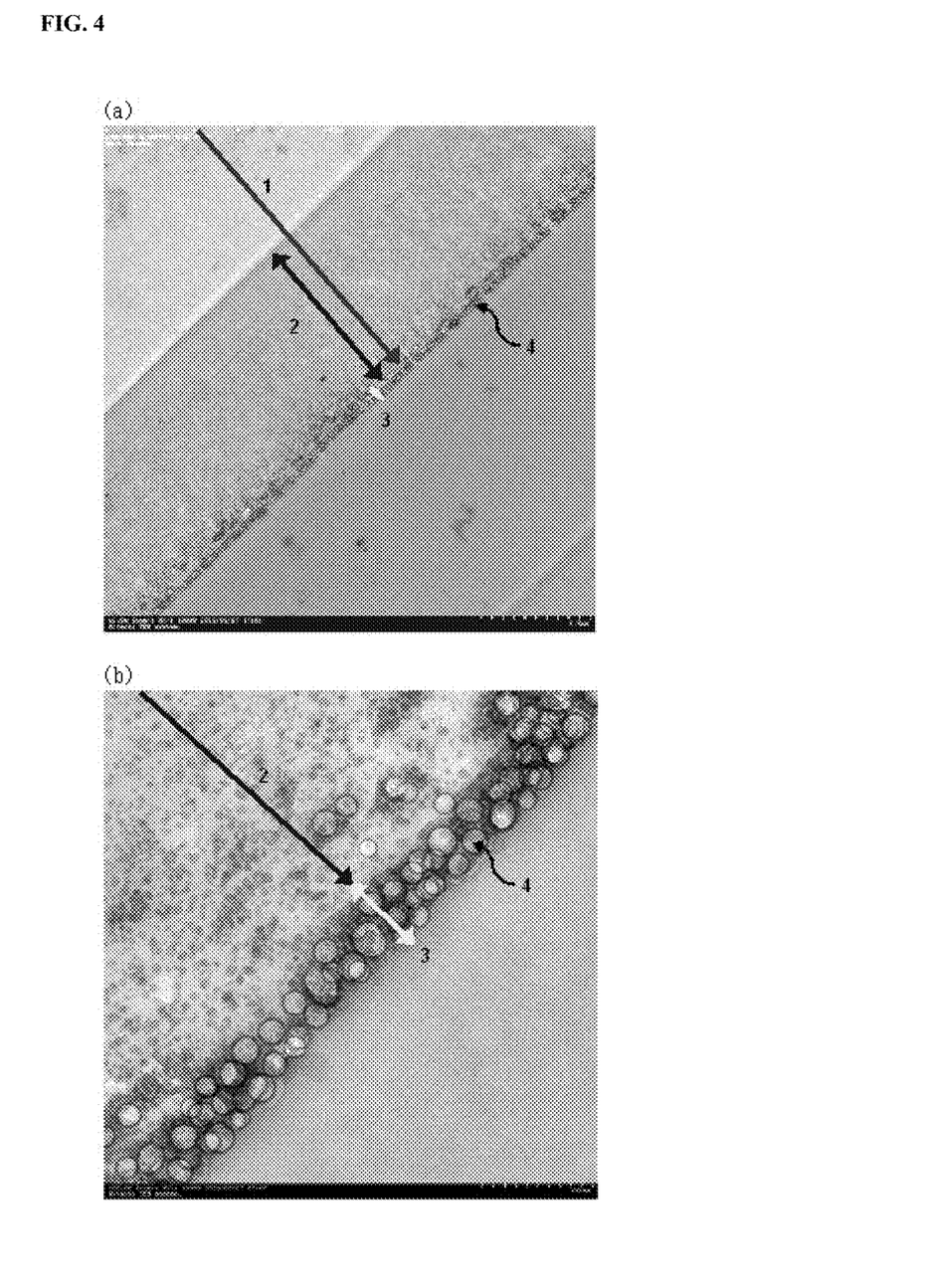

A cross-sectional image of the anti-reflective coating film is shown in FIG. 4(a), and a microscopic image of a part thereof is shown in FIG. 4(b). The anti-reflective coating film according to Example 2 was found to have a hard coat layer 2 (approximately 2.8 μm) comprising a binder cured by infiltration into a substrate 1 and inorganic nanoparticles dispersed in the binder; a low refractive index layer 3 (approximately 0.145 μm) comprising a binder cured on the hard coat layer 2 and hollow particles 4 dispersed in the binder.

In addition, there was no separate layer between the hard coat layer 2 and the low refractive index layer 3, and a ratio of the cross-sectional area of the hollow particles 4 to any cross-sectional area of the low refractive index layer 3 was approximately 90%, indicating that hollow particles 4 were very compactly distributed in the low refractive index layer 3.

In the anti-reflective coating film according to Example 2, in particular, fluorine-based acrylate was comprised in the low refractive index layer, and thus phase separation of the composition effectively occurred, and scratch resistance was also improved.

Example 3

Preparation of Anti-Reflective Coating Composition

Based on 100 parts by weight of a (meth)acrylate-based compound comprising 100 parts by weight of pentaerythritol hexaacrylate (molecular weight: 298.3) and 11.33 parts by weight of acrylate having a urethane functional group (manufactured by KYOEISHA, product name: 510H, molecular weight 2000);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

The anti-reflective coating composition was applied to a triacetate cellulose film (thickness of 80 μm) using a wire bar (No. 9). The film was dried in a 90° C. oven for 1 minute, and then UV energy of 200 mJ/cm$^2$ was irradiated thereto for 5 seconds to cure the composition.

Finally, an anti-reflective coating film comprising a hard coat layer formed by infiltration into a substrate and a low refractive index layer directly formed on the hard coat layer was manufactured.

A cross-sectional image of the anti-reflective coating film was visualized by SEM. As a result, the anti-reflective coating film according to Example 3 was found to have a hard coat layer (approximately 3.1 μm) comprising a binder cured by infiltration into a substrate and inorganic nanoparticles dispersed in the binder; a low refractive index layer (approximately 0.16 μm) comprising a binder cured on the hard coat layer and hollow particles dispersed in the binder.

In addition, there was no separate layer between the hard coat layer and the low refractive index layer, and a ratio of the cross-sectional area of the hollow particles to any cross-sectional area of the low refractive index layer was approximately 90%, indicating that hollow particles were very compactly distributed in the low refractive index layer.

Example 4

Preparation of Anti-Reflective Coating Composition

Based on 100 parts by weight of a (meth)acrylate-based compound comprising 100 parts by weight of pentaerythritol hexaacrylate (molecular weight: 298.3) and 11.33 parts by weight of acrylate having an ester functional group (manufactured by SK Cytec, product name: DPHA, molecular weight: 524);

approximately 15.87 parts by weight of silica nanoparticle-dispersed silica sol (dispersion medium: methyl isobutyl ketone and methyl alcohol, solid content: 40% by weight, number average diameter of silica nanoparticles: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 179.63 parts by weight of methyl ethyl ketone (MEK), approximately 24.07 parts by weight of ethanol, approximately 24.07 parts by weight of n-butyl alcohol and approximately 24.07 parts by weight of acetyl acetone) were mixed to prepare an anti-reflective coating composition.

(Manufacturing of Anti-Reflective Coating Film)

The anti-reflective coating composition was applied to a triacetate cellulose film (thickness of 80 μm) using a wire bar (No. 9). The film was dried in a 90° C. oven for 1 minute, and then UV energy of 200 mJ/cm$^2$ was irradiated thereto for 5 seconds to cure the composition.

Finally, an anti-reflective coating film comprising a hard coat layer formed by infiltration into a substrate and a low refractive index layer directly formed on the hard coat layer was manufactured.

Figure 5:
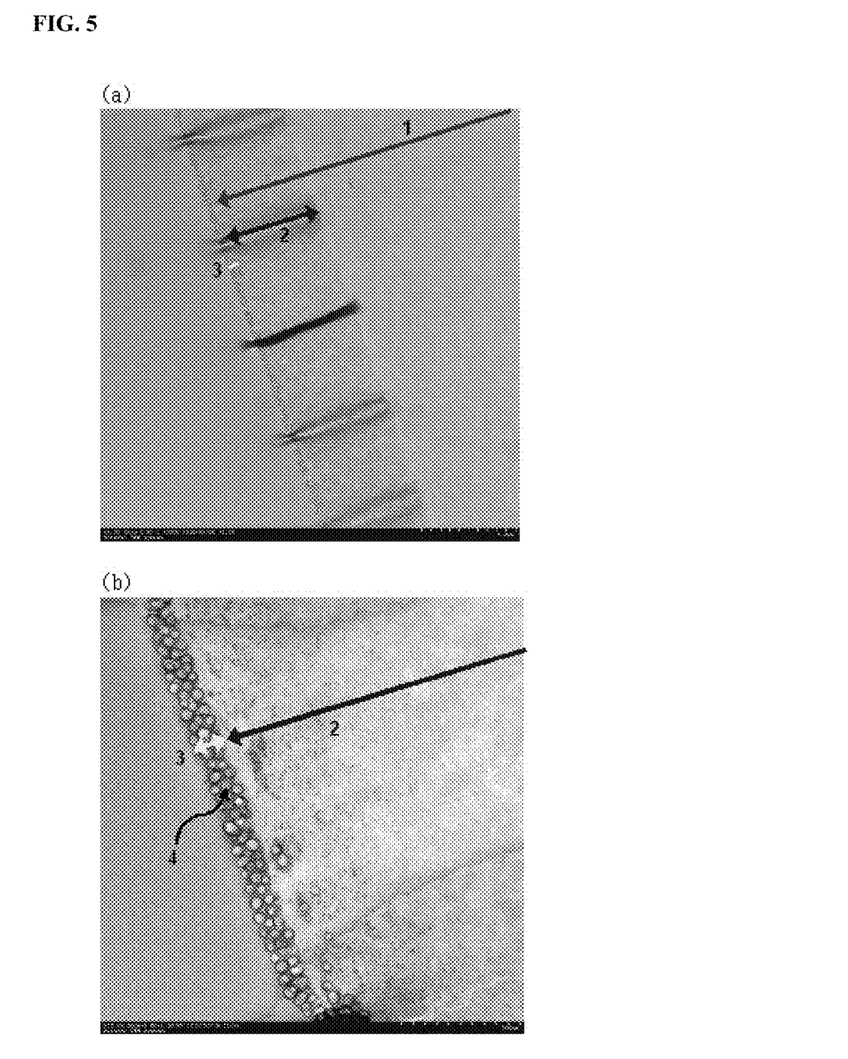

A cross-sectional image of the anti-reflective coating film is shown in FIG. 5(a), and a microscopic image of a part thereof is shown in FIG. 5(b). As shown in FIG. 5, the anti-reflective coating film according to Example 4 was found to have a hard coat layer 2 (approximately 2.78 μm) comprising a binder cured by infiltration into a substrate 1 and inorganic nanoparticles dispersed in the binder; a low refractive index layer 3 (approximately 0.18 μm) comprising a binder cured on the hard coat layer 2 and hollow particles 4 dispersed in the binder.

In addition, there was no separate layer between the hard coat layer 2 and the low refractive index layer 3, and a ratio of the cross-sectional area of the hollow particles 4 to any cross-sectional area of the low refractive index layer 3 was approximately 90%, indicating that hollow particles 4 were very compactly distributed in the low refractive index layer 3.

Comparative Example 1

Preparation of Anti-Reflective Coating Composition

Based on 100 parts by weight of pentaerythritol hexaacrylate (PETA); 15.87 parts by weight of silica nanoparticle-dispersed silica sol (dispersion medium: methyl isobutyl ketone and methyl alcohol, solid content: 40% by weight, number average diameter: 10 nm, manufactured by Gaematech, product name: Purisol);

approximately 11.33 parts by weight of a hollow silica-dispersed colloidal solution (dispersion medium: methyl isobutyl ketone, solid content: 20% by weight, number average diameter of hollow silica: 50 nm, manufactured by Catalysts & Chemicals Industries Co., product name: MIBK-sol);

approximately 10.85 parts by weight of a photoinitiator (specifically, approximately 1.11 parts by weight of Darocur-1173, approximately 6.48 parts by weight of Irgacure-184, approximately 2.15 parts by weight of Irgacure-819 and approximately 1.11 parts by weight of Irgacure-907); and approximately 251.85 parts by weight of a solvent (specifically, approximately 125.91 parts by weight of methyl isobutyl ketone, approximately 41.98 parts by weight of ethanol, approximately 41.98 parts by weight of n-butyl alcohol and approximately 41.98 parts by weight of acetyl acetone) were mixed to prepare an anti-reflective coating composition.

(Manufacturing of Anti-Reflective Coating Film)

An anti-reflective coating film was manufactured under the same conditions and in the same manner as in Example 1, except using the above anti-reflective coating composition. A cross-sectional image of the anti-reflective coating film is shown in FIG. 6(a), and a microscopic image of a part thereof is shown in FIG. 6(b).

Figure 6:
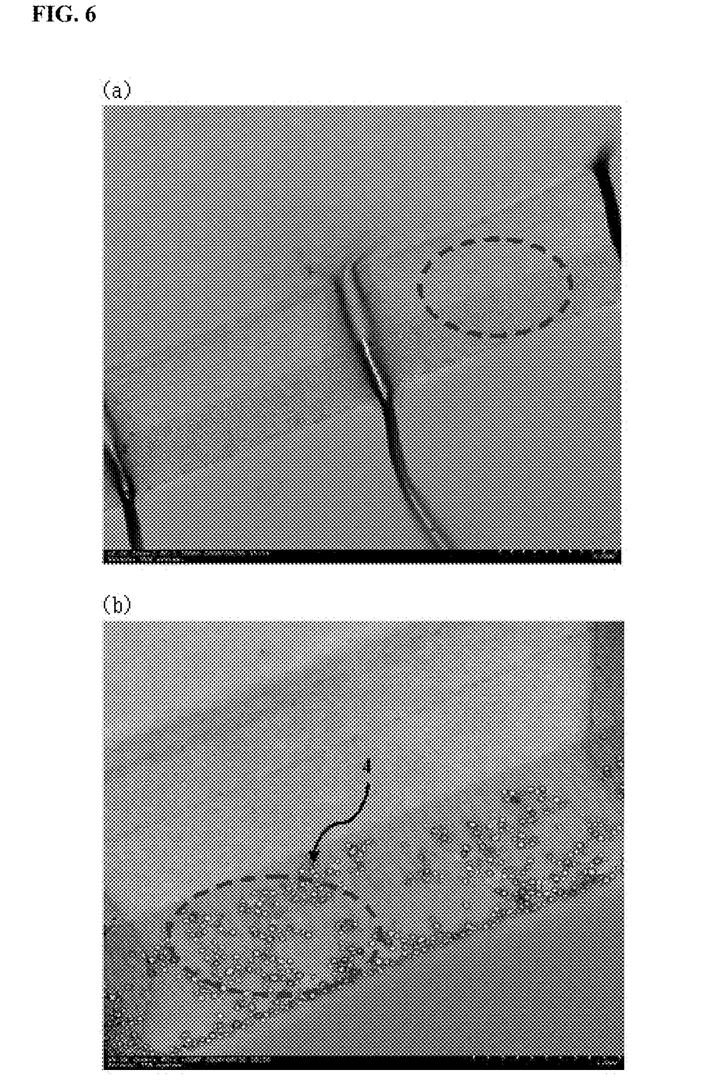

As shown in FIG. 6, in the anti-reflective coating film according to Comparative Example 1, phase separation of the composition did not occur properly (see the circle of FIG. 6(a)), and in particular, hollow particles 4 were very sparsely distributed in the low refractive index layer (see the circle of FIG. 6(b)). Thus, appearance of the film became opaque, and scratch resistance and anti-reflective effect were also reduced (see Experimental Example).

Experimental Example

The anti-reflective coating films manufactured by Examples and Comparative Example were evaluated for the following items, and the results are shown in the following Table 1.

1) Measurement of reflectance: the back side of the anti-reflective coating film was treated with black color, and then low reflection property was evaluated by minimum reflectance value. At this time, a Shimadzu Solid Spec. 3700 spectrophotometer was used for measurement.

2) Measurement of transmittance and haze: HR-100 (Murakami Co., Japan) was used to evaluate transmittance and haze.

3) Evaluation of scratch resistance: the anti-reflective coating film was rubbed using a steel wool with a load of 500 g/cm$^2$ at a speed of 24 m/min 10 times, and then the number of scratches having a length of 1 cm or longer was counted on the surface. At this time, when no scratch was found on the film surface, it was evaluated as "very excellent" (⊚), and when the numbers of scratch having a length of 1 cm or longer were 1 or more to less than 5, 5 or more to less than 15, and 15 or more, each was evaluated as "excellent" (○), "moderate" (Δ), and "poor" (X), respectively.

4) Microscopic imaging of cross-section of film: the cross-section of each film prepared by microtoming was observed using a Transmission Electron Microscope (name: H-7650, manufactured by HITACHI).

5) Evaluation of adhesion: adhesion of each film was evaluated by a cross cut test (ASTM D-3359) using a Nichiban tape.

TABLE 1

| | Reflectance (%) | Transmittance (%) | Haze (%) | Scratch resistance | Adhesion |
|---|---|---|---|---|---|
| Example 1 | 1.2 | 95.8 | 0.3 | ○ | 5B |
| Example 2 | 1.2 | 95.8 | 0.2 | ⊚ | 5B |
| Example 3 | 1.67 | 95.2 | 0.3 | ⊚ | 5B |
| Example 4 | 1.30 | 95.5 | 0.3 | ⊚ | 5B |
| Comparative Example 1 | 2.0 | 94.0 | 0.7 | Δ | 2B |

As shown in Table 1, the anti-reflective coating films according to Examples had lower reflectance and higher transmittance than the film of Comparative Example, and they exhibited excellent scratch resistance and adhesion.

The invention claimed is:

1. An anti-reflective coating composition, comprising
a (meth)acrylate-based compound having a first molecular weight;
a (meth)acrylate-based compound having a second molecular weight higher than the first molecular weight;
inorganic nanoparticles; and
hollow particles.

2. The anti-reflective coating composition according to claim 1, wherein the first molecular weight is less than 600, and the second molecular weight is 600 to 100,000.

3. The anti-reflective coating composition according to claim 1, further comprising an initiator.

4. The anti-reflective coating composition according to claim 1, further comprising a solvent.

5. The anti-reflective coating composition according to claim 1, comprising
5 to 30 parts by weight of the (meth)acrylate-based compound having the second molecular weight;
5 to 30 parts by weight of the inorganic nanoparticles;
1 to 30 parts by weight of the hollow particles;
5 to 25 parts by weight of the initiator; and
100 to 500 parts by weight of the solvent, based on 100 parts by weight of the (meth)acrylate-based compound having the first molecular weight.

6. The anti-reflective coating composition according to claim 1, wherein the (meth)acrylate-based compound having the first molecular weight is one or more compounds selected from the group consisting of pentaerythritol tri(meth)acrylate, pentaerythritol tetra(meth)acrylate, dipentaerythritol hexa(meth)acrylate, trimethylenepropane tri(meth)acrylate, ethylene glycol di(meth)acrylate, 9,9-bis[4-(2-acryloxyethoxy)phenyl]fluorene, bis(4-methacryloxythiophenyl)sulfide, and bis(4-vinylthiophenyl)sulfide.

7. The anti-reflective coating composition according to claim 1, further comprising a fluorine-based (meth)acrylate compound substituted with one or more fluorine atoms.

8. The anti-reflective coating composition according to claim 7, wherein the fluorine-based (meth)acrylate compound comprises one or more compounds selected from the group consisting of the compounds of the following Chemical Formulae 1 to 5:

[Chemical Formula 1]

wherein $R^1$ is a hydrogen group or an alkyl group having 1 to 6 carbon atoms, a is an integer of 0 to 7, and b is an integer of 1 to 3;

[Chemical Formula 2]

wherein c is an integer of 1 to 10;

[Chemical Formula 3]

wherein d is an integer of 1 to 11;

[Chemical Formula 4]

wherein e is an integer of 1 to 5;

[Chemical Formula 5]

wherein f is an integer of 4 to 10.

9. The anti-reflective coating composition according to claim 1, wherein the (meth)acrylate-based compound having the second molecular weight comprises a compound having two or more molecules of the (meth)acrylate-based compound having the first molecular weight linked via a linker.

10. The anti-reflective coating composition according to claim 9, wherein the (meth)acrylate-based compound having the second molecular weight comprises a compound having one or more substituents selected from the group consisting of an epoxy group, a hydroxyl group, a carboxyl group, a thiol group, an aromatic or aliphatic hydrocarbon group having 6 carbon atoms or more, and an isocyanate group.

11. The anti-reflective coating composition according to claim 9, wherein the linker comprises a urethane bond, a thioether bond, an ether bond or an ester bond.

12. The anti-reflective coating composition according to claim 4, wherein the solvent has a dielectric constant (25° C.) of 2030, and a dipole moment of 1.7~2.8.

13. The anti-reflective coating composition according to claim 1, wherein the inorganic nanoparticles have a number average diameter of 5 to 50 nm.

14. The anti-reflective coating composition according to claim 1, wherein the inorganic nanoparticles are silica nanoparticles.

15. The anti-reflective coating composition according to claim 1, wherein the hollow particles have a number average diameter of 5 to 80 nm.

16. The anti-reflective coating composition according to claim 1, wherein the hollow particles are hollow silica particles.

17. An anti-reflective coating film, comprising
a first layer that comprises a crosslinked polymer of a (meth)acrylate-based compound having a first molecular weight and inorganic nanoparticles in the crosslinked polymer, and that has infiltrated into a substrate; and
a second layer that comprises a crosslinked copolymer of the (meth)acrylate-based compound having the first molecular weight and a (meth)acrylate-based compound having a second molecular weight higher than the first molecular weight and hollow particles in the crosslinked copolymer, and that covers the first layer.

18. The anti-reflective coating film according to claim 17, wherein the first layer further comprises the region having the crosslinked copolymer of the (meth)acrylate-based compound having the first molecular weight and the (meth)acrylate-based compound having the second molecular weight, in addition to the region having the crosslinked polymer.

19. The anti-reflective coating film according to claim 17, wherein the first molecular weight is less than 600, and the second molecular weight is 600 to 100,000.

20. The anti-reflective coating film according to claim 17, wherein the second layer further comprises inorganic nanoparticles.

21. The anti-reflective coating film according to claim 18, wherein the region having the crosslinked copolymer is located to a depth of approximately 5 to 50% of the first layer, based on the interface between the first and second layers.

* * * * *